Patent text

2,992,197
MODIFIED OIL COPOLYMER EMULSIONS AND PROCESS OF PREPARING THE SAME

Robert A. Boller, Richfield, Minn., assignor to Archer-Daniels-Midland Company, Hennepin, Minn., a corporation of Minnesota
No Drawing. Filed Oct. 17, 1957, Ser. No. 690,632
10 Claims. (Cl. 260—22)

This invention relates to improved film forming emulsions and their method of preparation. More particularly this improvement concerns the method of preparing emulsion compositions of fine particle size, stable copolymers of oil-based, film-forming materials with vinyl monomers in the presence of oxidizing film-forming emulsifiers, and the products derived therefrom.

The literature is replete with papers relative to the preparation of the drying oil film-forming compositions based on variously modified drying oils. Such coating compositions are alkyd resins, oleoresinous compositions and chemically modified semi-drying and drying oil copolymers. These coating compositions are prepared by either the fusion cooking process or the azeotropic solvent process. Regardless of the process used, there is no water in the final product. Rather, the water is removed as fast as it is formed during the reaction. Further, these compositions are generally prepared at temperatures above 350° F. These film-formers are considered finished products and are thinned in various volatile organic solvents. In some cases these compositions have been reacted further at high temperatures in the absence of water with vinyl monomers to form coatings known to the industry as copolymer alkyd resins and oils. These are copolymers of a styrene derivative, acrylonitrile and other vinyl compounds. Again, these are thinned with organic solvents.

One of the goals set by the coatings industry has been the elimination of organic thinners in film forming coating materials. Attempts have been focused in the direction of using water for this purpose. These efforts have resulted in the introduction of the rubber latex emulsion and vinyl resin emulsion systems. Essentially, these are copolymers of styrene, acrylonitrile, butadiene, isoprene, vinyl esters and acrylic esters.

It is known to the art that alkyd resins and oleoresinous products can be converted into stable emulsions, capable of being thinned with water and yield good films upon drying. However, these products dry slower than those described in this invention. These dried films have poorer water, acid and alkali resistance when compared to films produced from the new emulsions described herein.

I believe that the longer drying time for the alkyd and oleoresinous emulsions, above, is due to the limitations placed upon their degree of polymerization and molecular size, which limitation is necessary to effectively emulsify them. Thus, a higher molecular weight requires a higher concentration of emulsifying agents. These emulsifying agents do not lose their identity as such during the process of oxidation in film formation. Consequently, the dried films show water and alkali sensitivity.

It is extremely difficult also to produce very small particles in emulsions of high molecular weight alkyd resins and oleoresinous vehicles. Smaller emulsion particles contribute better pigment binding, film coalescence and continuity. Hence, it is impossible to attain all necessary properties by merely emulsifying a preformed alkyd or oleoresinous body with conventional emulsifying agents.

The rubber-based lattices used for the preparation of paints have certain inherent disadvantages. These are their inability to form semi-gloss or gloss-type finishes and poor hiding characteristics in flat finishes. These paint films more or less show discoloration, embrittlement and poor adhesion on aging, are sometimes difficult to recoat, and show poor water resistance due to the presence of water soluble emulsifiers. The same paints have the advantage of low odor, non-flammability, fast dry and easy cleanup of applicators and spills.

I have discovered that the inherent disadvantages of latex, alkyd and oleoresinous emulsion systems can be overcome by co-reacting in an aqueous system at low temperatures, a modified drying oil and one of the vinyl monomers, with the critical aid of an oxidizing oil-based emulsifier. This discovery includes improved coating compositions of successfully dispersed water-insoluble modified drying oil materials in water with water-soluble film forming oxidizing emulsifiers and primarily to obtaining emulsion copolymerization of a modified drying oil with one or more vinyl monomers. To my knowledge, neither alkyd resins nor chemically-modified drying oils have heretofore been reacted with vinyl monomers in the presence of water to produce useful copolmers in the form of fine particle emulsions. The art lacks such compositions and information concerning techniques for combining these components into a desirable useful emulsion.

The usual compounds described in the literature and used as emulsifiers, whether they be anionic, cationic or non-ionic stabilizers and protective colloids, do not yield emulsions with the necessary desirable properties. My invention is based on the discovery that drying oil based film forming compositions are copolymerized by using a relatively large amount of an oil-based oxidizing emulsifier which has a water solubilizing effect on our emulsion components, a stabilizing effect on the emulsion and then loses its identity as an emulsifier during the film drying process. It is my belief that this novel multi-property oxidizing emulsifier becomes an integral part of the film during the drying process by becoming water insoluble and/or non-redispersible. This novel emulsifier has the property of water-solubilizing the drying oil-based coating compositions, i.e. alkyd resins, chemically modified drying oils or copolymer oils, with the vinyl monomers, thus bringing both into the loci of reaction to form a homogeneous copolymer emulsion system.

The emulsions of this disclosure are characterized by exceptionally fast dry especially at room temperature, to form hard, tough, chemical resistant, flexible, adherent films.

In present commercial emulsion paint systems both the pigment and polymer particles are dispersed in the water phase. Therefore, the pigment is not "wet" by the vehicle (polymer particles) as is the case in a conventional solvent-thinned paint system. This wetting of the pigment by the vehicle together with the amount of pigment has a pronounced influence on gloss development in the paint film. In emulsion systems the only chance the polymer has to "wet" the pigment is at the time of drying of the film when the polymer particles coalesce to form a film and bind the pigment particles together.

In essence, therefore, it is the purpose of this invention to show how drying oil film-forming compositions are emulsion copolymerized with vinyl monomers in the presence and aid of an oxidizing water soluble oil-based emulsifier to form useful water-thinned fine particle-size and stable emulsion film-forming or coating compositions.

It is another object of this invention to prepare a fine particle size stable oil-containing copolymer emulsion which possesses good freeze-thaw resistance, pH stability, no polymer settling and good chemical and mechanical stability.

A further object of this invention is to prepare emulsion systems which oxidize on drying, forming clear, continuous, water and alkali resistant films comprising the components which are being emulsified together with a film-forming, oxidizable oil-based emulsifier.

It is a further object of this invention to prepare an emulsion which dries to a clear film with a high gloss, possessing good adhesion and water-resistance both in the clear and pigmented forms.

It is a further object of this invention to prepare a fine particle emulsion system which is useful in the preparation of interior flat finishes, primer sealer systems, semi-gloss, gloss enamel finishes and industrial finishes.

It is a further object of this invention to provide an oxidizing oil based emulsifier, which loses its emulsifying properties upon oxidation in preparation of film forming compositions. Additional objects and advantages will be recognized from the following disclosure.

In the oil-based copolymer emulsions described herein, a relatively high level of a film forming oil-based oxidizing water-soluble emulsifier serves to "wet" the pigment particles in the paint and promotes a high gloss in the dried film. Also the extremely fine polymer particles of the emulsion are smaller than the pigment particles and the pigment binding power of the vehicle is thereby enhanced and tends to improve gloss characteristics of the film. Generally, as the particle size is decreased, the gloss will increase.

The oils and fatty acids used in the herein described emulsion polymerization systems are known by the protective coating industry as semi-drying and drying. Some typical base oil sources are cottonseed, corn, rape, tall, soybean, walnut, linseed, dehydrated castor, tung, menhaden, sardine, cod and pilehard. These oils are modified in the manner hereinafter described.

The following example is illustrative of the emulsions herein described:

EXAMPLE I

*Typical generic emulsion polymerization system*

| | Percent |
|---|---|
| A. Water | 35–80 |
| B. Water-soluble oil based oxidizing emulsifier | 2–35 |
| C. Anionic surface active agent | 0–5 |
| D. Nonionic surface active agent | 0–5 |
| E. Monomer soluble catalysts | .05–2 |
| F. Water soluble catalysts | .05–2 |
| G. Oil based water insoluble monomer | 3–35 |
| H. Vinyl monomer | 5–40 |
| I. pH regulator | .1–1.0 |
| J. Accelerator | .01–0.1 |
| K. Chain stopper | .05–0.2 |

Further information relative to the components listed in the above formula is as follows:

(A) *Water.*—Any clear potable water free of dispersed or suspended solids can be used. Extreme limits of water in a stable emulsion are between 35–80% but the preferred range is 50–60%.

(B) *Oil-based water-soluble oxidizing emulsifiers.*— One group of compounds in this family are the novel film-forming and oxidizable components described in the copending application of R. D. Jerabek, Ser. No. 531,250, now abandoned. Another group are based on the Clocker oils as described in U.S. Patents 2,188,882–90 inclusive.

The Jerabek compounds are oil-resin compositions applicable to the protective coating industry which have been modified to make them truly water soluble.

The basic film forming components of the oxidizing emulsifiers are as follows:

(1) Oleo-resinous bodies in which a natural or synthetic resin, e.g. copal, ester gum or modified phenolic is cooked into a drying oil, e.g. linseed, China wood and the like in varying ratios;

(2) Alkyd resins, in which the dibasic acid, e.g., a phthalic acid, maleic acid, with a polyol e.g. glycerol, a pentaerythritol etc. and a fatty or rosin acid or mixtures or other acids are cooked together in any one of the myriad of combinations possible; and, (3) Copolymer vehicles, in which either an oleoresinous body, alkyd resin, or drying oil are reacted with an unsaturated aliphatic or cyclo-aliphatic hydrocarbon, e.g. butadiene, cyclopentadiene, or vinyl aromatic, e.g. a styrene in varying proportions.

The basic Jerabek compositions must possess a definite acid value. Sometimes the acidity inherent in these bodies in sufficient to solubilize them. If this is not the case, they are reacted with alpha-beta unsaturated dicarboxylic acids or anhydrides, e.g. maleic, fumaric or their homologues, to form a Diels-Alder or succinyl type adduct. Thus, high molecular weight acids are produced. For water solubility these compounds are neutralized with ammonia or amines to form the corresponding salt.

These ammonia or substituted ammonium salts or soaps are made truly water soluble by the use of a cosolvent chosen from the family of preferably water soluble "Cellosolves," "Carbitols," alcohols, glycols, esters, ethers and the like. "Cellosolves" and "Carbitols" are ethylene and diethylene glycol ethers, respectively.

Some typical but non-limiting types of Jerabek oil-resin oxidizing emulsifier compositions are as follows:

(1) Oleoresinous varnish composed of linseed oil, pentaerythritol rosin ester reacted with isopropyl acid maleate to an acid value of 71.6 and neutralized with ammonia.

(2) Alykd resin composed of soya fatty acids, adipic acid, benzoic acid and glycerol reacted to an acid value of 28, and neutralized with dimethyl ethanol amine.

(3) Alykd resin composed of linseed acids, isophthalic and maleic acids and glycerol reacted to an acid value of 43 and neutralized with ammonia.

(4) Linseed oil-cyclopentadiene (ratio 83/17) copolymer plus 10/ maleic anhydride neutralized with ammonia.

(5) Linseed oil-cyclopentadiene (ratio 83/17) copolymer plus 10% maleic anhydride neutralized with triethylamine.

The clocker group of oils serving as oxidizing emulsifiers are the simple addition compounds of semi-drying and drying oils, such as soybean, linseed and the like with alpha-beta dicorboxylic unsaturated acids or anhydrides. In essence, the reaction products are high molecular weight acids, which are capable of the usual acid reactions. Esterification and/or neutralization or both are the preferred reactions utilized in this invention.

Some typical but non-limiting Clocker oxidizing emulsifier oils are as follows:

(1) Soybeans oil plus 10% maleic anhydride neutralized with ammonia.

(2) Linseed oil plus 10% methallyl acid maleate neutralized with morpholine.

(3) Linseed oil plus 8% maleic anhydride esterified with pentaerythritol to an acid value of 27 and then neutralized with ammonia.

(4) Soybean oil plus 19% maleic anhydride esterified with pentaerythritol to an acid value of 67 and neutralized with ammonia.

(5) Linseed oil plus 10% maleic anhydride esterified to the half ethyl ester and neutralized with ammonia.

When reacted with ammonia and/or a substituted ammonia, they also become water soluble in the presence of the previously mentioned cosolvents.

The Clocker oils differ from the Jerabek compounds inmolecular complexity and molecular weight. The latter contain resinous components while the former do not, but either can be used.

The acidity of the Jerabek and Clocker products, can be totally or fully neutralized e.g. by the following non-limiting compounds: ammonia, morpholine, tri- and dimethyl amine, mono-, di- and triethyl amine and ethanol amine. Ammonia is preferred.

Obviously a wide variety of products are possible. Each one contributes certain properties to the dried films prepared from the emulsions containing each. Generally, the products of the Jerabek group are preferred to the Clocker type. The former because of their resinous character produce harder and tougher films, however, the choice of compound from either group is determined by economics and desired end use or film characteristics.

In the emulsion systems these products are used in the range of 2 to 35% of the emulsion weight. However, the preferred range is between 5 and 20%.

(C) and (D) *Surface active agents.*—Small quantities, of synthetic emulsifiers are desirable in addition to the oil based oxidizing emulsifier. They improve emulsion stability, monomer conversion and aid in viscosity control. These emulsifiers are to be differentiated from those mentioned in "B" above in that they do not lose their chemical identity and are not converted to an insoluble state during oxidation and film formation.

Anionic surface active agent

An anionic emulsifier provides the micelles in which the polymerization is initiated. Therefore the type and level of this emulsifier has a very pronounced influence upon the reactivity and final conversion of the monomers. It is to be noted that as the level of the anionic emulsifier is increased the water resistance of the dried film will be decreased.

Some typical non-limiting anionic emulsifiers are:

Sodium alkyarylpolyether sulfonates
Sodium alkylaryl polyether sulfates
Sodium tetradecyl sulfonate
Sodium dioctyl sulfosuccinate
n-Octadecyl disodium sulfosuccinamate
Sodium dihexyl sulfosuccinate
Sodium dodecyl benzene sulfonate The preferred level of use is on the order of 0.4% of the emulsion weight.

Non-ionic surface active agent

Emulsifiers in this group aid in emulsion stability and viscosity control.

Some typictal non-limiting members are :

Nonyl phenoxy polyoxyethylene ethanol
Polyethylene glycol ester or rosin
Iso-octyl phenoxy polyoxyethylene ethanol
Alkyl phenyl polyethylene glycol ether
Ditertiary acetylenic glycols
Polyoxypropylene polyoxyethylene condensates
Polyethylene glycol monolaurate
Ethylene and propylene oxide adducts of fatty alcohols The preferred level of us is on the order of 1.5% of the emulsion weight.

(E) and (F) *Polymerization catalysts.*—A combination of water-soluble and monomer-soluble catalysts has been found to be the most advantageous from the standpoint of monomer conversion and emulsion particle size. These typcial catalysts are potassium persulfate, ammonium persulfate, hydrogen peroxide, benzoyl peroxide, methyl ketone peroxide, and cumene hydroperoxide. The range of use is between about .05% and 2% on the emulsion weight. The preferred combination as about .8% to 1.9% potassium persulfate and about .2% to .5% benzoyl perodixed.

(G) *Oil based water-insoluble monomer.*—A vinyl reactive modified oil is incorporated into the emulsion in the form of a water insoluble monomer. This compound must have a group capable of reacting with the vinyl monomer to form homogeneous copolymers. I believe that this modified water insoluble oil forms a copolymer with the vinyl monomer which contributes greatly to film flexibility and adhesion.

(1) One variety of water-insoluble oil based monomer is made by reacting a drying or semi-drying oil with a polyhydric alcohol in the presence of a basic catalyst to form an alcoholysis product. This is reacted further with an alpha-beta mono- or dibasic unsaturated acid at a low temperature, i.e. 300°–390° F.

These oil monomers are derived from linseed, soya, fish and safflower oils. The oils are conventionally alcoholyzed with glycerol, pentaerythritol or sorbitol with the aid of conventional basic alcoholysis catalysts. The alcoholysis products are then esterified with crotonic, cinnamic, maleic, fumaric, itaconic and citraconic acids at low temperature. In lieu of the glycerides the corresponding fatty acids, including tall oil, may be esterified with excess polyhydric alcohol to acid values preferably below 10.

A large number of oil compositions are possible. The oil modification is reckoned on the acid modification. The practical dicarboxylic acid modification can vary from 2% to 15% based on the oil, with about 3% to 8% the preferred range. The polyol used is stoichiometrically equivalent to the acid modifier plus 5%–20% excess.

The modified oil must contain a point of reactivity with which the low molecular weight vinyl monomers can react. I believe that this loci of reaction in the emulsion polymerization is the ethylenic group of the dicarboxylic radical acid in modified oil provided the reaction temperature of the esterification is low, i.e. in the range of 300° F. to 390° F.

The method for the preparation of typical monomers of this type are described in a copending patent application by Konen and Boller, Serial No. 378,692, now U.S. Patent 2,877,194.

If temperatures used in modified oil synthesis are in excess of those indicated, i.e. about 390° F. the oils are not reactive with vinyl monomers.

The following reactions believed involved in (I) the high and (II) the low temperature preparation of alpha-beta mono- and dicarboxylic acid modified oil derivatives are illustrated further, with e.g. specifically, maleic anhydride.

(I) High temperature reaction product not useful in emulsion polymerization of this disclosure.

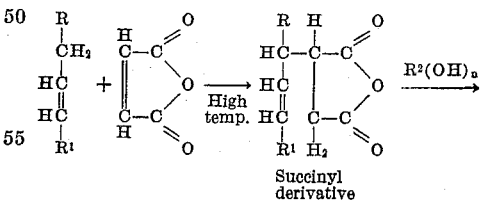

Succinyl derivative

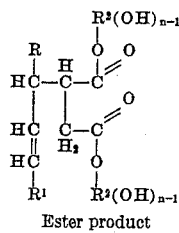

Ester product

Where R and $R^1$ are the remaining parts of the drying oil molecule; $R^2$ is a polyhydric alcohol radical, and $n$ is an interger of 2 to 8. The ethylenic group or groups in the base oils, radicals, R and $R^1$ are non-reactive with vinyl monomers, in emulsion polymerization.

(II) Low temperature esterification which yields a product reaction useful in emulsion preparations of this disclosure.

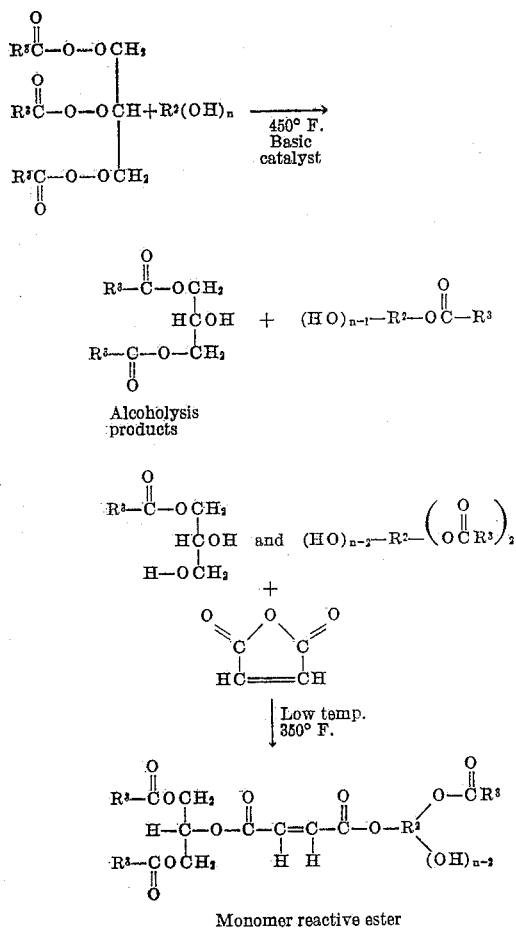

Alcoholysis products

Monomer reactive ester where $R^3$ is a typical drying oil fatty acid radical, and $R^2$ and $n$ as previously defined.

The above equations are only typical and non-limiting showing what I believe to be the difference in structure of the high and low temperature modified oils. Thus in reaction II, the ethylenic group in the maleic bridge of the modified oil is reactive with vinyl compounds, whereas the ethylenic group or groups, in the fatty acid radicals, $R^3$, and the parts of the oil molecule $R^1$ and $R^2$ of reaction I, are non-reactive in emulsion polymerization.

The following are several preferred types of modified oils, prepared at low temperature via reaction II, which are useful in emulsion polymerization.

(a) Soybean oil alcoholized with pentaerythritol and then reacted with 5% maleic anhydride. (Acid value=8.)

(b) Linseed oil alcoholized with pentaerythritol and reacted with 5% maleic anhydride. (Acid value=6.)

(c) Soybean oil alcoholized with pentaerythritol and then reacted with 8% maleic anhydride. (Acid value=9.)

(d) Linseed oil alcoholized with pentaerythritol and then reacted with 8% maleic anhydride. (Acid value=9.)

(e) Soybean oil alcoholized with pentaerythritol and then reacted with 3% maleic anhydride. (Acid value 5.)

(2) Other drying oil derived compounds useful in emulsion polymerization containing a group reactive with vinyl monomers are the vinyl esters and ethers of the fatty acids or fatty alcohols, respectively.

These compounds have the following typical structures:

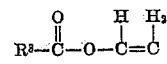

and

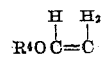

where $R^3$ is a typical drying oil fatty acid radical and $R^4$ is an alcohol radical derived from the acid containing $R^3$.

(3) Esterification products derived from the drying and semi-drying oil fatty acids, an amino-alcohol and any form of formaldehyde or formaldehyde release agent are water insoluble oils useful in this invention.

These compounds can be made by either of two processes, as described in Brit. Pat. 564,506 of August 28, 1944, or U.S. Pat. 2,559,440 of July 13, 1951. In the former, the amino alcohol is reacted with formaldehyde first, followed by reaction with drying or semi-drying oil fatty acids. The process of the latter patent reverses this procedure. Para formaldehyde or 37% aqueous formaldehyde can be used in the ratio of 2 moles per amine group. For this invention I prefer the process of the British patent.

In some cases a further modification with dicarboxylic acids, e.g. maleic, phthalic, adipic and the like, is desirable.

For the purposes of this invention, the preferred products are the linseed and soya fatty acid derivatives. The final product derived from tris (hydroxymethyl) amino methane, as per Brit. Pat. 564,506 is indicated to have the following structure:

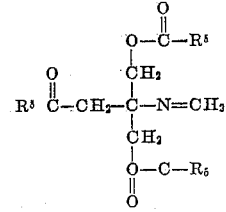

where

is specifically the soya or linseed fatty acid radicals.

Amino alcohols which are useful in this process follow:

2 amino-1, 3-propandiol
2 amino-2 methyl-1, 3-propandiol
2 amino-2 methylol-1, 3-propandiol
Tris (hydroxymethyl) amino methane
2 amino-2-ethyl-1, 3-propandiol
2 amino-2-ethylol-1, 3-propandiol
2 amino-2 isopropyl-1, 3-propandiol For this invention, the tris (hydroxymethyl) amino methane is preferred because of its greater functionality.

In the structure stated for the esterification product, the $-N=CH_2$ group is present. This group is capable of polymerizing with itself or copolymerizing with vinyl monomers. Because of this property it is especially useful as the water insoluble oil based monomer in emulsion polymerization.

The following are some of the preferred oil-based water insoluble monomer modifiers:

(a) Tris (hydroxymethyl) amino methane, linseed fatty acid and formaldehyde reaction product. (Acid value=10.)

(b) Ditto with dehydrated castor oil acids. (Acid value=12.)

(c) Ditto with soya fatty acids. (Acid value=9.)

(d) Ditto with soya fatty acids and modified further with 2% maleic anhydride. (Acid value=14.)

Three groups of oil based water insoluble monomers have been described above. The preferred oil based water insoluble monomers are the low temperature maleic modified oils or those based upon tris (hydroxymethyl) amino methane. They can be used in the range of 3% to 35% based upon the emulsion weight. The range of 5 to 15% is preferred.

(H) *Vinyl monomers.*—Compounds containing an emulsion polymerizable vinyl group can be used. Some are more reactive than others. They can be used as single components or as mixtures.

Typical compounds in this class are:

| | |
|---|---|
| Styrene | Ethyl methacrylate |
| Alpha methyl styrene | Butyl methacrylate |
| Vinyl toluene | Ethyl acrylate |
| Divinyl benzene | Butyl acrylate |
| Methyl acrylate | Vinyl acetate |
| Acrylonitrile | N-vinyl-2-pyrrolidone |
| Methyl methacrylate | |

In this family, after cost, ease of handling, odor and polymer film characteristics are considered, vinyl toluene was found to be the most satisfactory in the emulsion polymerization with oil-based materials. The mar-resistance of vinyl toluene-oil copolymer films can be improved to a certain extent by using vinyl toluene in conjunction with a methacrylate or acrylonitrile. Levels up to about 50% of vinyl toluene can be replaced.

Unexpectedly, the methacrylate esters further decrease emulsion particle size, thus making it possible to prepare highly pigmented and gloss finishes.

In this group of vinyl monomers the vinyl-toluene methacrylate ester combination is preferred. A methacrylate may replace between 3 and 20 parts of vinyl toluene. The total vinyl monomer modification generally comprises between 5 and 40% of the emulsion with 20–30% preferred.

(I) *pH control.*—When the polymerization catalysts of the persulfate type decompose acidic products result. The acids tend to increase emulsion viscosity and if the pH goes below 6.7–7.0 the water-soluble oxidizing emulsifier may separate from the emulsion. Since an emulsion of the highest possible solids and a workable viscosity is desired, it is preferred to buffer the system to maintain a pH in the 8.2–8.6 range during the reaction. Bases, e.g. sodium, potassium and ammonium hydroxide are, therefore, added continuously in small increments during the polymer formation. Sodium hydroxide is preferred for this purpose and used in the range of about .2% to .5%.

(J) *Accelerators.*—Accelerators such as ferric-ferrous chloride and sodium bisulfite can be used during polymerizations to aid in reaction speed or reaction completeness if desired. However, no great advantage for their use is seen in the systems described in this disclosure.

(K) *Chain stoppers.*—These comprise the family of tertiary mercaptans. They can be used if desired. In the systems described herein no apparent advantages occur from their use.

*General methods of preparation*

A reactor equipped with a good agitator, cooling and heating coils, two addition tubes, one for the monomers G and/or H and one for the catalyst F, is required. A built-in pH regulator is advantageous.

The kettle is charged with water, A, the oil-based water-soluble oxidizing emulsifier, B, and other emulsifying agents, C and D. A mixture of all of the oil-based water-insoluble monomer, G, with about 25% of the vinyl monomer component or components, H, is added to the kettle and the temperature raised to about 160–170° F. At this point an initial charge of polymerization catalyst, E and F, is made. As the temperature rises to 185° F. the addition of the remaining mixture of vinyl component, H, is started. About 15–45 minutes later the remaining water soluble catalyst, F, and pH regulator, I, are gradually added in the aqueous solution. The addition of monomer, H, from this point causes an exothermic reaction which is controlled so that the temperature remains within the range of 185–195° F. After all the monomer, H, has been added together with the remaining catalyst solutions, F, the temperature is raised to about 200–210° F. and held for ½–1½ hours to insure complete reaction. After this period the emulsion is cooled to about 80° F. and is ready for drumming.

The following are some typical but non-limiting examples illustrating the preparation of the several components of the emulsion and the emulsion per se.

EXAMPLE II

This example illustrates the preparation of emulsion vehicles showing the beneficial effects produced by the use of the water soluble oil based oxidizing emulsifier in comparison to emulsions without this oxidizing emulsifier.

| | Parts by Weight | | |
|---|---|---|---|
| | a | b | c |
| A. Tap water | 41.88 | 41.88 | 41.88 |
| B. Water soluble oil based oxidizing emulsifier [1] (copolymer type) | 19.00 | | |
| C. Anionic surface active agent [2] | 0.40 | 0.40 | 1.20 |
| D. Nonionic surface active agent [3] | 1.48 | 1.48 | 4.45 |
| E. Benzoyl peroxide | .37 | .37 | .37 |
| F. Potassium persulfate | .98 | .98 | .98 |
| G. Oil-based monomer [4] | 23.35 | 23.35 | 23.35 |
| H. Vinyl toluene | 12.10 | 12.10 | 12.10 |
| I. Sodium hydroxide | 0.44 | 0.44 | 0.44 |
| | 100.00 | 81.00 | 84.77 |

[1] Linseed oil cyclopentadiene (ratio 83/17) copolymer plus 10% maleic anhydride neutralized with ammonia, 43% non-volatile.
[2] Sodium tetradecyl sulfonate.
[3] Polyoxypropylene polyoxyethylene condensate.
[4] Soybean oil alcoholyzed with pentaerythritol and reacted with 5% maleic anhydride at low temperatures, i.e. 300–390° F.

*Procedure of preparation*

(1) Charge 75% of A, and all of C, D, and/or B to a reactor as previously described. The pH of the above solution should be 8.10–8.40, and may be adjusted with ammonium hydroxide or acetic acid.

(2) Apply heat and agitation. Begin addition of mixture of all of G and 25% of H and continue until complete (about 20–30 minutes) at which time the temperature should be 135–145° F.

(3) Continue agitation and heating and at 150–160° F. add E and 25% of F.

(4) At 188–190° F., begin adding remaining H at a rate such that all the monomer will be added in approximately two hours at 185°–195° F.

(5) Dissolve 75% of F and all of I in remaining 25% of A and begin adding to reaction mixture 15 minutes after start of monomer, H, in step 4. The rate should be so adjusted that the solution will be added over a two hour period.

(6) After all additions have been completed, the temperature is raised to 204–205° F. and held 1.5 hours to insure high monomer conversion.

(7) The emulsion is cooled to 80° F. or below and discharged.

| Properties | a | b | c |
|---|---|---|---|
| Emulsion stability | excellent | poor (coagulate). | good. |
| Film gloss and clarity | do | | fair. |
| Water resistance of dried film | do | | poor-fair. |

The above three comparative examples demonstrate the advantages of using an oxidizing emulsifier (column *a*). Column *b* is identical to *a*, but contains no water soluble oil based oxidizing emulsifier and did not form a stable emulsion. Column *c* contains much higher levels of conventional anionic and nonionic emulsifiers. Though the emulsion stability was relatively good, the dried film had poor water resistance and only fair gloss and clarity.

EXAMPLE III

This example illustrates the preparation of emulsion vehicles showing the effect of mixed versus single component vinyl monomers on emulsion particle size.

|  | a | b |
|---|---|---|
| A. Tap water | 41.88 | 41.88 |
| B. Water soluble oil-based oxidizing emulsifier [1] | 19.00 | 19.00 |
| C. Anionic surface active agent [2] | 0.40 | 0.40 |
| D. Nonionic surface active agent [3] | 1.48 | 1.48 |
| E. Benzoyl peroxide | .37 | .37 |
| F. Potassium persulfate | .98 | .98 |
| G. Oil-based monomer [4] | 12.10 | 12.10 |
| H. 1 Vinyl toluene | 23.35 | 21.60 |
|    2 Methyl methacrylate |  | 1.75 |
| I. Sodium hydroxide | 0.44 | 0.44 |
|  | 100.00 | 100.00 |

[1] Linseed oil-cyclopentadiene copolymer plus 10% maleic anhydride neutralized with ammonia, 43% non-volatile.
[2] Sodium dodecyl benzene sulfonate.
[3] Ditertiary acetylenic glycol.
[4] Long oil alkyd composed of soybean fatty acids, pentaerythritol, maleic anhydride reacted at low temperatures, i.e. 300-390° F.

The method of preparation was identical to that in Example II.

Emulsion a was stable and gave a clear, flexible film with excellent water resistance. Particle size of emulsion a averaged 0.5 micron. Emulsion b was also stable and gave a clear, flexible film with excellent water resistance, but the particle size of emulsion b was considerably smaller than a and averaged 0.05 micron.

EXAMPLE IV

This example illustrates the use of mixed vinyl monomers. The use of a water soluble oil base oxidizing (alkyd resin) emulsifier is illustrated.

| A. Tap water | 41.18 |
|---|---|
| B. Water soluble oil based oxidizing emulsifier (alkyd resin type) [1] | 18.00 |
| C. Anionic surface active agent [2] | 0.44 |
| D. Nonionic surface active agent [3] | 1.56 |
| E. Benzoyl peroxide | 0.44 |
| F. Potassium persulfate | 0.91 |
| G. Oil-based monomer [4] | 12.50 |
| H. (Vinyl toluene) | 19.30 |
|    (Ethyl acrylate) | 5.20 |
| I. Sodium hydroxide | 0.47 |
|  | 100.00 |

[1] Alkyd resin composed of linseed fatty acids, phthalic anhydride and pentaerythritol reacted to acid value of 98 and neutralized with ammonia. Non-volatile 43%.
[2] Sodium alkyl aryl polyether sulfonate, such as "Triton X-200." *
[3] Alkyl aryl polyether alcohol, such as "Triton X-100." *
[4] Linseed oil alcoholyzed with pentaerythritol and reacted with 4.5% maleic anhydride at low temperatures, i.e. 300°-390° F.

The preparation procedure was as described in Example II. The result was a white, stable emulsion with 250 cps. viscosity. It formed a clear, flexible film with high degree of water resistance.

EXAMPLE V

This example illustrates the beneficial effect possible by comparing water insoluble maleated modified oils of identical compositions made at low and high temperatures.

|  | a | b |
|---|---|---|
| A. Tap water | 41.88 | 41.88 |
| B. Water soluble oil-based oxidizing emulsifier [1] (copolymer type) | 19.00 | 19.00 |
| C. Anionic surface active agent [2] | 0.40 | 0.40 |
| D. Nonionic surface active agent [3] | 1.48 | 1.48 |
| E. Benzoyl peroxide | .37 | .37 |
| F. Potassium persulfate | .98 | .98 |
| G. (1) Oil-based monomer [4] | 12.10 |  |
|    (2) Modified oil [5] |  | 12.10 |
| H. Styrene | 23.35 | 23.35 |
| I. Sodium hydroxide | 0.44 | 0.44 |
|  | 100.00 | 100.00 |

[1] Linseed oil-cyclopentadiene (ratio 83/17) copolymer plus 10% maleic anhydride neutralized with ammonia, 43% non-volatile.
[2] Sodium tetradecyl sulfonate.
[3] Polyoxypropylene polyoxyethylene condensate.
[4] Soybean oil alcoholyzed with pentaerythritol and reacted with 5% maleic anhydride at low temperatures, i.e. 300°-390° F.
[5] Soybean oil alcoholyzed with pentaerythritol and reacted with 5% maleic anhydride at high temperatures, i.e. 450°-460° F.

The method of preparation was same as Example II. Emulsion a, was very stable and deposited films which dried with excellent clarity, gloss and water resistance. Emulsion b tended to separate on againg and films were cloudy, dull and only fair in water resistance.

Since the compositions of G-1 and G-2 were identical, the only difference is in the structure of the molecule as outlined under "Oil-based water-insoluble monomers" in the disclosure. Item G-1, which is used in stable emulsion a, contains maleic unsaturation for reaction with the vinyl monomer to give a clear homogeneous polymer. Item G-2, which has lost its maleic unsaturation because of the formation of the succinyl derivative, does not contain a vinyl monomer reactive point and a heterogeneous mixture results.

EXAMPLE VI

This example illustrates the use of mixed vinyl monomers and a water soluble oil based oleoresinous type emulsifier.

| A. Tap water | 41.00 |
|---|---|
| B. Water soluble oil based oxidizing oleoresinous emulsifier [1] | 18.35 |
| C. Anionic surface active agent [2] | 0.40 |
| D. Nonionic surface active agent [3] | 1.50 |
| E. Benzoyl peroxide | 0.40 |
| F. Potassium persulfate | 0.90 |
| G. Oil-based monomer [4] | 12.50 |
| H. (Vinyl toluene) | 23.30 |
|    (Butyl methacrylate) | 1.20 |
| I. Sodium hydroxide | 0.45 |
|  | 100.00 |

[1] Oleoresinous varnish composed of linseed oil, pentaerythritol rosin ester with isopropyl acid maleate to an acid value of 71.6 and neutralized with ammonia. Non-volatile 43%.
[2] Sodium alkyl aryl polyether sulfonate such as "Triton X-200."
[3] Alkyl aryl polyether alcohol such as "Triton X-114." †
[4] Long oil alkyd composed of tall oil acids, pentaerythritol and maleic anhydride reacted at low temperatures, i.e. 300°-390° F.

The preparation procedure was the same as in Example II. A stable emulsion of 500 centipoise viscosity was the result. It dried to a clear flexible film with excellent water resistance.

EXAMPLE VII

This example further illustrates the preparation of an emulsion vehicle in which the water insoluble oil based

---

\* Manufactured by Rohm & Haas Co. and noted in their 1951 copyright publication entitled "Triton Surface Active Agents" and as set forth in U.S. patents of S. Doughty et al. 2,829,035 and D. G. Grenley et al. 2,840,491.

† An octyl phenoxyethanol or otherwise t-octyl phenol polyether alcohol, a product of Rohm & Haas Co.

vinyl reactive monomer is a linseed fatty acid tris (hydroxymethyl) amino methane reaction product.

| | |
|---|---|
| A. Tap water | 42.00 |
| B. Water soluble oil based oxidizing emulsifier [1] | 18.30 |
| C. Anionic surface active agent [2] | 0.50 |
| D. Nonionic surface active agent [3] | 1.50 |
| E. Methyl ketone peroxide | .35 |
| F. Potassium persulfate | 1.00 |
| G. Oil based monomer [4] | 12.50 |
| H. Styrene | 23.40 |
| I. Potassium hydroxide | 0.45 |
| | 100.00 |

[1] Linseed oil-cyclopentadiene (83/17) copolymer plus 11% maleic anhydride neutralized with ammonia, non volatile 43%.
[2] Sodium dihexyl sulfosuccinate.
[3] Iso-octyl phenoxy polyoxyethylene ethanol.
[4] Tris (hydroxymethyl) aminomethane, linseed fatty acid and formaldehyde reaction product.

The method of preparation was the same as in Example II.

A stable emulsion is the result. It forms clear, high gloss, tough films with excellent water resistance.

EXAMPLE VIII

This example illustrates the preparation of a flat paint with the emulsion vehicle of Example II a.

PART I

| | Parts by weight |
|---|---|
| (a) 2% Hydroxyethyl cellulose in water | 220.0 |
| (b) "Carbitol" (diethylene glycol mono ethyl ether) | 17.1 |
| Hexylene glycol | 15.4 |
| (c) Water-dispersible lecithin | 10.0 |
| (d) Non-ionic surface active agent [1] | 3.0 |
| (e) Preservative [2] | 1.0 |
| (f) Odorless mineral spirits | 12.6 |
| (g) Rutile titanium dioxide | 200.0 |
| Calcium carbonate | 250.0 |
| Magnesium silicate | 50.0 |

PART II

| | |
|---|---|
| Water | 148.0 |
| Emulsion (Example II a) | 260.0 |
| 6% cobalt (water dispersible) | 0.4 |
| | 1187.5 |

[1] Alkyl phenyl polyethylene glycol ether, such as "Tergitol NPX."
[2] Phenyl mercuric acetate.

The flat paint had the following constants:

| | | |
|---|---|---|
| PVC | percent | 57.0 |
| Percent solids | do | 53.5 |
| Consistency | ku | 75–85 |

The thickener, a, pigment dispersant, c, and other liquid components, b, d, e, and f, of Part 1 of the formula are thoroughly mixed. Pigments g are then added and the mixture passed through a conventional paint roller mill. The items of Part 2 of the formula are then added slowly with thorough agitation to the pigment paste, Part 1. Slow agitation is preferred to eliminate air entrainment. Mixing is continued for 20 to 30 minutes. In lieu of the roller mill, a pebble mill can be used.

This paint is characterized by ease of application by brush, roller or spray over surfaces of varying porosity and composition. Films attain an exceptionally high degree of water resistance and adhesion. The paints can be readily tinted with any of the tube systems commercially available.

Driers may or may not be used with the emulsion vehicles when used in clear or pigmented finishes. If driers are used, usually 0.2 to .20% cobalt or manganese metal as naphthenate or equivalent water dispersible types are recommended. However, the products will dry sufficiently well without them.

EXAMPLE IX

Gloss paints heretofore have not been successfully prepared from emulsion systems. When sufficient pigment (titanium dioxide) is added to obtain hiding, the films of paints heretofore made with butadiene-styrene, polyvinyl acetate or acrylic emulsions do not exhibit a gloss finish.

This example is illustrative of the advantageous effect which the emulsion of Example III-b has when compared to commercial emulsions in the preparation of gloss paints.

PART 1

| | lbs. | | | |
|---|---|---|---|---|
| | (a) | (b) | (c) | (d) |
| (a) Casein Solution (25% N.V.) | 80 | 80 | 80 | 80 |
| (b) "Cellosolve" | 31 | 31 | 31 | 31 |
| (c) Water dispersible lecithin | 5 | 5 | 5 | 5 |
| (d) Non-ionic surface active agent [1] | 2 | 2 | 2 | 2 |
| (e) Preservative [2] | 1 | 1 | 1 | 1 |
| (f) Defoamer | 2 | 2 | 2 | 2 |
| (g) Rutile titanium dioxide | 250 | 250 | 250 | 250 |

PART 2

| | | | | |
|---|---|---|---|---|
| Water | 140 | 140 | 140 | 140 |
| Polyvinyl acetate copolymer emulsion (55% N.V.) | 445 | | | |
| Acrylic emulsion (45% N.V.) | | 530 | | |
| Butadiene-styrene emulsion (48% N.V.) | | | 510 | |
| Oil-based copolymer emulsion (Example III-b, 45% N.V.) | | | | 540 |
| Water | 95 | 10 | 30 | |
| | 1,049 | 1,049 | 1,049 | 1,049 |

[1] Alkyl phenyl polyethylene glycol ether, such as "Tergitol NPX," a product of Carbide and Carbon Chemicals Co. See Technical Information Bulletin F–8156, published April 1953.
[2] Phenyl mercuric acetate.

These paints were prepared as described in Example VIII. Each paint had the same amount of pigment and vehicle non-volatile.

The following 60° gloss readings were obtained on the dried film by use of the 60° Gardner glossmeter.

| | (a) | (b) | (c) | (d) |
|---|---|---|---|---|
| 60° Gloss reading | 30 | 54 | 62 | 84 |

The dried paint film of the emulsion of Example IIIb exhibited gloss, water resistance and adhesion which was definitely superior to any of the other paints.

As a less desirable and modified composition it may be possible, in some instances, to first copolymerize the vinyl monomer with a drying or semi-drying oil made reactive by modification with an alpha-beta unsaturated dibasic acid at the low temperature indicated, or with an amino polyhydric alcohol and a formaldehyde material, and thereafter emulsify the copolymer with the water soluble oil based oxidizing emulsifier.

The emulsion compositions described can be thinned with water and are particularly useful as film forming coating materials, as described. Other uses are as printing vehicles, adhesives, and in the molding and casting arts.

Having described the present embodiment of my improvement in the art in accordance with the patent statutes, it will be apparent that some modifications and variations of the character as hereinto set forth may be made without departing from the spirit and scope thereof. The specific embodiments described are given by way of examples illustrative of the improvement which is to be limited only by the terms of the appended claims.

I claim:

1. An aqueous system containing a continuous phase and an in-situ formed dispersed phase comprising: (1) in the continuous phase, water and about 2% to about 35% oxidizable emulsifier with a film forming property and comprising water soluble salts of long chain fatty ester polymers formed of long chain fatty acid materials selected from the group consisting of drying oils, semi-drying oils, polyhydroxy alcohol long chain fatty esters, and cyclopentadiene derivatives of said long chain fatty acid materials modified with an agent selected from the group consisting of dicarboxylic acids, alkyl modified dicarboxylic acids, dicarboxylic acid anhydrides, and mixtures of the same, and (2) in the dispersed phase, an in-situ polymerization product of: (a) about 3% to about 35% unsaturated long chain fatty ester monomers containing polymerizable ethylenic linkages and comprising an esterification product formed of a long chain fatty acid material selected from the group consisting of drying oils, semi-drying oils and long chain fatty acid and alcohol ester derivative thereof modified with an alcohol and polycarboxylic acid material selected from the groups consisting of polyhydroxy alcohols and alpha beta ethylenic polycarboxylic acids and their anhydrides, and mixtures of the same, and (b) from about 5% to about 40% polymerizable monomers having a terminal ethylenic $>C=CH_2$ group.

2. The emulsion system of claim 1 wherein, the long chain fatty ester monomers are a said long chain fatty acid material alcoholyzed with pentaerythritol and esterified with maleic anhydride.

3. The emulsion system of claim 1 wherein, in the continuous phase (1) the emulsifier portion comprises a water soluble salt of a said long chain fatty acid material copolymerized with cyclopentadiene and modified with maleic anhydride, in the disperse phase (2), the polymerizable long chain fatty ester monomer portion comprises (a) a partial ester of a said long chain fatty acid material and polyhydroxy alcohol esterified with maleic anhydride and the said polymerizable monomers having a terminal ethylenic $>C=CH_2$ group (b) is selected from the group consisting of styrene, alpha methyl styrene, vinyl toluene, methyl acrylate, ethyl acrylate, butyl acrylate, acrylonitrile, methyl methacrylate, ethyl methacrylate, butyl methacrylate, vinyl acetate, N-vinyl-2-pyrrolidone, and mixtures of the same.

4. The resin system of claim 1 where, the said unsaturated long chain fatty ester monomers containing polymerizable ethylenic linkages are partial esters of a drying oil and a polyhydroxy alcohol esterified with a said alpha beta ethylenic dicarboxylic acid material, the said polymerizable monomers having a terminal ethylenic $>C=CH_2$ group are selected from the group consisting of styrene, alpha methyl styrene, vinyl toluene, methyl acrylate, ethyl acrylate, butyl acrylate, acrylonitrile, methyl methacrylate, ethyl methacrylate, butyl methacrylate, vinyl acetate, N-vinyl-2-pyrrolidone, and mixtures of the same, and the said emulsifier is a water soluble salt of a modified long chain fatty acid polymer modified with a said dicarboxylic acid material.

5. The product of claim 1 wherein, the emulsifier is a cyclopentadiene drying oil copolymer modified with an alpha-beta ethylenic dicarboxylic acid material selected from the group consisting of maleic acid, isopropyl acid maleate, maleic anhydride, fumaric acid, itaconic acid and itaconic anhydride.

6. The in-situ method of forming an emulsion of fine particle size with (1) about 3%-35% modified long chain fatty ester monomers containing polymerizable ethylenic groups with (2) about 5%-40% polymerizable monomers having a terminal ethylenic $>C=CH_2$ group comprising the steps of (a) mixing water and about 2%-35% emulsifier comprising an oxidizable film forming, water soluble salt of a dicarboxylic acid modified long chain fatty ester material, (b) adjusting the pH of the solution from about 8.1 to about 8.4, (c) mixing said modified long chain fatty ester monomers together with a portion of said polymerizable monomers having terminal ethylenic $>C=CH_2$ group (d) agitating and heating the mixture to about 135° F. to about 145° F., (e) gradually increasing the heat to about 150° to about 160° F., (f) adding a polymerizing catalyst and raising the heat to about 188° F. to about 190° F., (g) gradually adding additional said polymerizable monomers having a terminal ethylenic $>C=CH_2$ group over an extended period at a temperature range of about 185° F. to about 195° F., (h) gradually adding a water solution of additional catalyst and neutralizing agent to the reaction mix shortly after start of the additional said polymerizable monomers having a terminal ethylenic $>C=CH_2$ group in the immediate foregoing step, (i) completing the addition of the said polymerizable monomers, water, catalyst, and neutralizing agent, (j) raising the temperature on the order of 205° F. for a period to obtain high monomer conversion, and effecting the formed product as a water dilutable emulsion.

7. In the method of forming an emulsion product of fine particle size consisting of the in-situ polymerization of long chain fatty ester monomers containing polymerizable ethylenic groups in combination with polymerizable monomers having a terminal ethylenic $>C=CH_2$ group the steps comprising (1) mixing said modified long chain fatty ester monomers containing polymerizable ethylenic groups and said polymerizable monomers having a terminal ethylenic $>C=CH_2$ group in a water solution containing an emulsifier comprising an oxidizable film-forming water soluble salt of a dicarboxylic acid modified long chain fatty ester material, (2) adding a polymerizing catalyst and a neutralizing agent, (3) agitating and heating the mixture to a temperature on the order of between 135° F. to about 205° F. for a period to obtain high monomer conversion, and (4) effecting the production of the emulsion product in the presence of the said emulsifier.

8. In the process of preparing an infinitely water dilutable emulsion of dispersed polymers derived from monomers each containing a terminal ethylenic $>C=CH_2$ group and an esterification product of modified long chain fatty ester monomers each containing a polymerizable ethylenic group, the steps comprising mixing water and an oxidizable film-forming emulsifier comprising a water soluble salt of a dicarboxylic acid modified long chain fatty polymer, adding said modified long chain fatty ester monomers and a portion of said polymerizable monomers having terminal ethylenic groups $$>C=CH_2$$

to the said mixture, adding a polymerization catalyst, heating the mixture to a temperature of about 160° F. to about 185° F., adding the balance of said polymerizable monomers having terminal ethylenic $>C=CH_2$ groups, adding additional catalyst and a pH regulator, heating and effecting the production of an emulsion of the said modified long chain fatty ester monomers and said polymerizable monomers having terminal ethylenic $>C=CH_2$ groups in the water solution of the said oxidizable film-forming emulsifier.

9. The process of claim 8 wherein, the said emulsifier is a water soluble salt of a dicarboxylic acid anhydride modified drying oil polymer.

10. The process of claim 8 wherein, the unsaturated long chain fatty ester monomers are esterification products of a drying oil fatty acid, a polyhydroxy-amino alcohol and formaldehyde having —N—CH$_2$ groups which are polymerizable with said polymerizable monomers each having a terminal ethylenic $>C=CH_2$ group.

References Cited in the file of this patent

UNITED STATES PATENTS

| | | |
|---|---|---|
| 2,457,025 | Benignus | Dec. 21, 1948 |
| 2,586,092 | Robinson | Feb. 19, 1952 |
| 2,634,245 | Arndt | Apr. 7, 1953 |